United States Patent
Van Den Nieuwelaar et al.

(10) Patent No.: US 8,105,138 B2
(45) Date of Patent: Jan. 31, 2012

(54) DEVICE AND METHOD FOR CONDITIONING SLAUGHTERED POULTRY AND PRODUCTION LINE FOR PROCESSING POULTRY CARCASSES

(75) Inventors: Adrianus Josephes Van Den Nieuwelaar, Gemert (NL); Bernardus Petrus Van De Camp, Uden (NL); Maurice Eduardus Theodorus Van Esbroeck, Bemmel (NL); Andries Johan Martijn Kuijpers, Westerbeek (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 292 days.

(21) Appl. No.: 12/374,938

(22) PCT Filed: Jul. 9, 2007

(86) PCT No.: PCT/NL2007/050336
§ 371 (c)(1),
(2), (4) Date: Feb. 24, 2009

(87) PCT Pub. No.: WO2008/013446
PCT Pub. Date: Jan. 31, 2008

(65) Prior Publication Data
US 2010/0022176 A1 Jan. 28, 2010

(30) Foreign Application Priority Data
Jul. 24, 2006 (NL) ...................................... 2000159

(51) Int. Cl.
*A22B 7/00* (2006.01)
(52) U.S. Cl. ...................................................... 452/177

(58) Field of Classification Search .......... 452/177–184, 452/106, 110–114, 117, 120, 123
See application file for complete search history.

(56) References Cited

U.S. PATENT DOCUMENTS

| | | | |
|---|---|---|---|
| 2,560,067 A | 7/1951 | Bell | |
| 2,785,437 A | 3/1957 | Standley et al. | |
| 2,958,092 A | 11/1960 | Curtis | |
| 3,979,793 A * | 9/1976 | Hazenbroek | 452/118 |
| 4,283,813 A * | 8/1981 | House | 452/106 |
| 4,322,872 A | 4/1982 | Meyn | |
| 4,458,380 A | 7/1984 | Tendick et al. | |
| 4,513,476 A * | 4/1985 | Olson et al. | 452/174 |
| 4,899,421 A * | 2/1990 | Van Der Eerden | 452/116 |
| 5,913,720 A * | 6/1999 | Scott et al. | 452/120 |
| 6,033,296 A * | 3/2000 | Winkelmolen | 452/63 |
| 6,371,843 B1 * | 4/2002 | Volk et al. | 452/106 |
| 6,398,636 B1 * | 6/2002 | Jansen et al. | 452/122 |
| 7,377,843 B2 * | 5/2008 | Koops | 452/58 |
| 7,597,615 B2 * | 10/2009 | van den Nieuwelaar et al. | 452/182 |
| 7,837,540 B2 * | 11/2010 | van den Nieuwelaar et al. | 452/177 |

(Continued)

FOREIGN PATENT DOCUMENTS
EP 0 350 399 A1 1/1990
(Continued)

*Primary Examiner* — Richard Price, Jr.
(74) *Attorney, Agent, or Firm* — Birch, Stewart, Kolasch & Birch, LLP

(57) ABSTRACT

The invention relates to a device for conditioning slaughtered poultry, provided with a carries (3) provided with a contact surface for locally engaging a first carcass part of a slaughtered poultry animal at a first position. The invention also relates to a method for conditioning slaughtered poultry, and to a production line for processing poultry carcasses transported hanging in carriers.

26 Claims, 17 Drawing Sheets

U.S. PATENT DOCUMENTS 7,846,012 B2 * 12/2010 Koops .......................... 452/58

FOREIGN PATENT DOCUMENTS

| EP | 0 395 169 A2 | 10/1990 |
| EP | 0 413 629 A1 | 2/1991 |
| EP | 1 665 936 A1 | 6/2006 |
| FR | 2 522 475 A1 | 9/1983 |
| NL | 7905612 A | 1/1981 |

* cited by examiner

DEVICE AND METHOD FOR CONDITIONING SLAUGHTERED POULTRY AND PRODUCTION LINE FOR PROCESSING POULTRY CARCASSES

The present invention relates to a device and method for conditioning slaughtered poultry. The invention moreover relates to a production line for processing poultry carcasses transported hanging in carriers.

The slaughter and subsequent processing of poultry, such as particularly chickens, chicks and broilers, but also turkeys and ducks, can be performed according to the prior art in (highly) automated manner. After being killed, the poultry is here usually carried by a transport system along different processing stations until the poultry has been cleaned sufficiently, had undesired parts removed and optionally been disassembled. The thus obtained slaughter products are dressed and packaged such that they can be delivered to the relevant customers. A problem in the automatic processing of poultry slaughter products is that, depending on the form in which the end product must be packaged, this final process step must usually be performed manually. This is the case for instance in trussing, i.e. tying a slaughter product in a specific form, of poultry which is sold as a whole product. This manual labour is physically demanding; the products are cooled and forces in the order of magnitude of as much as 50 N are required per operation in order to reposition carcass parts such as wings and legs relative to each other. An employee herein takes for instance both drumsticks of a slaughtered animal in the palms of the hand and rotates the thighs. The drumsticks are then pivoted downward. The hip-joint (Articulatio Coxae) and the knee-joint (Articulatio Femoropaterallis) are thus brought into a desired (folded) position in successive steps and remain roughly in the desired position after this operation. The legs can then be tied together.

In the prior art (EP 0 413 629) a device is also described with which the legs of poultry can be brought into a desired position and the poultry subsequently trussed. This has an extremely complex construction, as a result of which placing of the poultry into and removal thereof from said device also requires time-consuming operations. This application also shows that the market is searching for a solution for fully automating trussing of poultry.

The present invention has for its object to improve the working conditions and to reduce the workload involved in conditioning slaughtered poultry.

The present invention provides for this purpose a device for conditioning slaughtered poultry, comprising: a carrier provided with a contact surface for locally engaging a first carcass part of a slaughtered poultry animal at a first position, an engaging element provided with at least one contact surface for locally engaging a second carcass part of the slaughtered poultry animal at least at a second position, and drive means for relatively displacing the carrier and the engaging element such that the first and second carcass parts move relative to each other, wherein the carrier forms part of a transport system with which the poultry are displaced hanging in the carrier. Conditioning is here understood to mean removing the rigor mortis of parts of the carcass with the purpose of facilitating manual processing. The carrier is preferably adapted here to engage on a first carcass part defined by two separate legs. The term "legs" should be broadly interpreted here; this is also understood to mean leg parts such as legs shortened to a greater or lesser extent (long legs and short legs). In practice use is made for this purpose of a transport hook in which the slaughtered poultry animal is suspended.

Such transport hooks are already generally applied in existing transport systems with which the slaughtered poultry animals are carried along successive processing stations. By applying an existing hook in the device according to the invention, it becomes possible to fit the conditioning device in an existing production line. This of course provides the advantage of simple supply and discharge of products to and from the present device. In other words, it becomes possible with the present invention to incorporate a conditioning device according to the present invention in an existing production line provided with an overhead conveyor. Conditioning is thus fully automated and the device can be integrated in existing production lines without specific modifications. The device is not intended exclusively for the processing of complete poultry animals whose legs and neck have been shortened; other random parts (such as for instance halved animals) can also be conditioned using the present device.

It is further desirable that the carrier is advanced such that the straight line through the engaging positions of separate legs substantially coincides with the transporting direction of the carriers in the transport system. In other words, the slaughtered poultry is advanced sideways. This makes it possible to apply less expensive rigid hooks in the transport system instead of rotatable hooks which make it possible to move poultry animals with the breast or the back in forward direction, this being necessary for the processing of poultry in conventional manner. Using a rigid hook (non-rotatable hook) it is only possible to advance the poultry in a lateral orientation. Conditioning according to the present invention is possible in a lateral orientation of the poultry animals; rotation of the poultry for conditioning purposes is unnecessary. The use of the relatively simple non-rotatable hook in a (part of a) slaughter line represents a substantial saving when compared to the (partial) use of rotatable hooks.

In order to prevent an engaged poultry animal detaching from the carrier during conditioning, it is desirable for the carrier to co-act with locking means for locking the first carcass part in an engaged position in the carrier. Such locking means can for instance comprise a guide part connected to the fixed world. This means that the guide part does not form part of an advancing conveyor but is stationary relative to the conveyor. It is however possible for the locking means to be adjustable and/or displaceable so as to thus vary for instance the position in which the legs are locked in the carrier or the length of the legs to be locked, for instance in order to compensate, among other things, variation in the dimensioning between different batches. The locking of the legs in the carrier could possibly even be adjustable at individual level such that the position of the locking means is optimized for each individual poultry animal.

Yet another variant of the device is provided with additional pressing means which operate close to the carrier and using which leg parts can be displaced relative to the leg parts engaged by the carrier. Specifically envisaged here is the bending of parts of longer legs which sometimes also have to be folded together during dressing. This folding together of longer legs can also be simplified by means of the present invention.

In the case where it is difficult to fit a conditioning device according to the present invention into a production line, for instance because of lack of space or because of the balancing of required processing capacity, it is also possible for the device according to the present invention to comprise a carousel in which a plurality of carriers can be held simultaneously. A plurality of successive conditioning steps (partial processes) can be performed in the carousel; in addition to the advantage that a carousel enables a more compact construction of the slaughter line, a carousel creates flexibility in respect of the capacity to be installed.

In a specific embodiment variant the engaging element is a press-on element, and the vertical through the carrier encloses an acute angle with a contact surface of the pusher directed toward the carrier. This embodiment variant of the device is particularly adapted for conditioning of the legs of poultry animals while the carrier and the pusher are moving toward each other. The contact surface is dimensioned such that it is suitable for engaging on at least a part of the body of the slaughtered poultry animal. As a result of the inclining position of this contact surface relative to a direction of movement according to the vertical through the carrier with which the carrier and the pusher move toward each other, the angular position of the body relative to the legs engaged by the carrier will be changed as a consequence of the force exerted by the contact surface. The body shifts or slides over the contact surface as the pusher moves inward and is herein forced into a different orientation. The pusher can for instance be given a concave form, this also having the advantage that the body, self-locating in lateral orientation, will be able to take up a desired position relative to the pusher. It is further desirable that the pusher is provided with at least one stop on the side of the contact surface remote from the carrier. This stop will ensure that the distance through which the body of a poultry animal can slide over the contact surface is limited. The stop prevents the body sliding further than a determined maximum, and the orientation of the body relative to the pusher will, at least substantially, no longer change as the pusher and the carrier move further toward each other. This orientation is now determined by the contact surface and the stop.

In yet another embodiment variant of the device the engaging element comprises at least two wing folding members which are displaceable such that their mutual distance is variable. Such an embodiment variant of the device is particularly adapted to condition the wings when the carrier and the engaging element move apart, and more particularly to cause the wings to fold out and take up more or less the same positions such that they are more readily processable in subsequent processing operations. In this context the term conditioning is understood to mean not only reducing the rigor mortis of the wings; the term conditioning can here also be understood to mean positioning of the wings. For this purpose the wing folding members must engage behind the wings and then be moved downward relative to the engaged legs; the wing folding members will thus begin to exert a force on the wings such that they are urged away from the body of the poultry animal. These wing folding members can advantageously be provided with curved contact surfaces directed toward each other. The curvature of the contact surfaces is preferably such that the contact surfaces (at least partially) connect to the sides of the poultry animals. In a spaced-apart relative orientation these wing folding members can be placed at the position of the sides of a poultry animal and then moved toward each other against the sides of the relevant poultry animal. Once the wing folding members connect to the sides of the poultry animal, they can be moved in a direction away from the carrier; provided they are given a sufficiently thin form without this causing damage to the poultry animal, the wing folding members will then slide under the wings and, as the movement continues further, spread the wings (press the wings outward) as described above.

For a good connection of the wing folding members to the sides of the poultry the contact surfaces are given a substantially concave form; they are more particularly preferably concave such that they are complementary to the average (convex) form of the sides of the poultry animals.

The wing folding members are advantageously mounted pivotally on a shared carrier such that the mutual distance between the contact surfaces as a result of pivoting the wing folding members is variable. The wing folding members are pivoted apart before they are brought into contact with a poultry animal. When they reach the correct height relative to the poultry animal (a position between the legs and the wings) they are pivoted inward such that they both lie against the poultry animal. After a full conditioning cycle has been completed, the wing folding members are simply pivoted apart and are situated in a relative orientation which makes it possible to once again engage a subsequent poultry animal. It is also advantageous if the distance between the wing folding members can be reduced until the wing folding members are in a crossed position. In such a crossed position the wing folding members overlap each other and, provided only that the mutual distance between the wing folding members is here kept small enough, the wings cannot therefore come loose of the wing folding members until these latter have been moved over the full length of the wings. The mutual distance between the wing folding members is ideally smaller than the thickness of the wings; the wings can thus never pass prematurely between the wing folding members; that is, before the wings have been processed along the whole length by the wing folding members. The tips of the wings will, among other parts, also be thus positioned.

The device can also be embodied with a combination of a pusher as described above and wing folding members, likewise as described above. With such a device two processes can be performed efficiently; during a movement of the carrier and the engaging means toward each other (inward stroke) particularly the legs will be conditioned, and during moving apart of the carrier and the engaging means (outward stroke) the wings will be conditioned. The wing folding members are herein located between the carrier and the pusher. Both the inward and the outward stroke are thus employed productively. Furthermore, both the pusher and the wing folding members can be operated using only a single drive and control mechanism; this is clearly efficient.

The invention further also provides a method for conditioning slaughtered poultry, comprising the processing steps of: A) supplying a slaughtered poultry animal in line with a carrier engaging locally at a first position on a first carcass part of the poultry animal, B) locally engaging at least one second carcass part of the slaughtered poultry animal at a second position with an engaging element, and C) mechanically displacing the carrier and the engaging element relative to each other such that the first and second carcass parts move relative to each other. The poultry animals supplied in line are here preferably advanced sideways hanging from the legs. The above stated advantages in respect of the device according to the invention can be realized by means of this method; in effective manner the legs and/or wings of poultry animals transported in a continuous production line can be efficiently conditioned. It is also very advantageous here that the rigor mortis of the poultry animals can be reduced locally in a lateral orientation; this means that conditioning in this manner does not require a rotatable carrier (hook) which, in view of the large number of hooks (many thousands in a normal production line with cooling line), results in a very considerable saving on the cost of carriers.

The engagement of the carrier on the poultry is preferably locked so as to minimize waste as a result of the conditioning. A poultry animal must of course not become detached from the carrier with one or both legs during conditioning; it is precisely the conditioning in the carrier while maintaining the grip on the poultry animal by the carrier that makes the conditioning according to the present invention one of the significant advantages of the present method.

The carrier and the engaging element can be moved during processing step C) from a first position spaced further apart to a second position closer to each other such that the engaging element pushes the poultry animal upward by the body, wherein the legs are rotated relative to the body. In addition, it is desirable that the carrier and the engaging element are moved during processing step C) from a second position lying closer to each other to a first position spaced further apart. This process can be performed so as to thus allow the poultry animal to return more or less to the original position in which it was situated before the conditioning process began. These two processing steps can, if desired, also be repeated a number of times until the movement of the legs is sufficiently easy that subsequent trussing/dressing is impeded as little as possible. When reducing the rigor mortis in this manner, it is additionally also possible to envisage moving one or more leg joints in order to thus also reduce the rigor mortis of the legs. This is of course particularly interesting for poultry with long legs which have been less drastically shortened.

As alternative to or in combination with the pushing upward, is also possible that the engaging element, using mutually displaceable wing folding members, engages the poultry animal at the position of the sides such that, when the carrier and the engaging element are moved apart, the wing folding members contact the body of the poultry between the wings and, when the mutual displacement of the carrier and the engaging element is continued further, press the wings away from the body of the poultry animal. When the carrier and the engaging element are moved further apart it is possible that the wing folding members displace the wings such that the wing folding members are moved over the wings and then detach from the wings. In this way the wing folding members are carried a distance from the body of the poultry animal and brought into a more or less standardized spaced-apart position, which simplifies subsequent processing of the wings and simplifies the standardization of the subsequent process(es). It is otherwise possible to control this mutual distance of the wing folding members such that they can only exert a determined maximum force on a slaughtered animal, this so as to prevent damage to a slaughtered animal. It is also possible to envisage intelligent control of the mutual distance between the wing folding members such that this varies subject to the position (in particular the height) they occupy relative to the slaughtered animal. In yet another preferred application the wing folding members are in a crossed position during movement over the wings. As already indicated above, it is possible in this manner to prevent one or both wings detaching from the wing folding members before these latter have been moved over the full length of the wings. A condition for being able to ensure that the wings do not prematurely detach from the wing folding members is that the mutual distance of the crossed wing folding members is smaller than the thickness of the wings to be processed. After passing through processing step C) the poultry animal can be engaged manually and further processed. The resistance to rotation of the legs and the resistance to displacement of the position of the wings is reduced, with the favourable consequence that this simplifies the further processing of the poultry animal; less (muscular) strength is required for instance during dressing or trussing in order to place the poultry animals in the desired position.

As described above, the carrier and the engaging element can be moved to a position closer to each other and then moved apart in a return movement. Using such a double stroke, the legs of the poultry animal are conditioned in a first stroke and the wings are conditioned in the second return stroke, as well as the legs being conditioned once again in the second stroke (albeit generally to a lesser extent than in the first stroke) because they at least substantially return to their starting position before the conditioning process begins.

The present invention also provides a production line for processing poultry carcasses transported hanging in carriers, comprising: a transport system provided with carriers in which the poultry is displaced in hanging position, wherein the carriers engage on the transport system with a fixed orientation such that the straight line between the engaging positions of individual legs in a carrier substantially coincides with the transporting direction of the carriers in the transport system, visual inspection means ("AQS") for inspecting external characteristics of the individual poultry animals transported by the transport system, and a device for conditioning poultry as described above, wherein the visual inspection means are disposed in the transporting direction downstream of the device for conditioning poultry. The conditioning means can thus ensure that the individual poultry animals are supplied to the inspection means in a more or less universal method of orientation. This will of course greatly improve the inspection result. Fewer errors will thus be made during visual inspection because for instance a wing which is not folded out is erroneously seen as an irregularity of the breast, with the result of less incorrect rejection. Another example of improved visual inspection possibilities are the shadow areas which formerly could not be viewed satisfactorily. Such locations with difficult visual access will also be left clear in standardized manner as a result of folding out the wings. For instance haemorrhaging on the inner sides of the wings or on the breast under the wings will thus be easier to trace because of the present invention. It is noted that this effect is greatest during conditioning of the wings. The transport system is preferably an endless system. The visual inspection means are preferably formed by a camera system, also referred to as a vision system. The inspection results can then be utilized to control one or more other linked processes.

Alternatively, the invention also provides a production line for processing poultry carcasses transported hanging in carriers, comprising: a transport system provided with carriers in which the poultry is displaced in hanging position, wherein the carriers engage on the transport system with a fixed orientation such that the straight line between the engaging positions of individual legs in a carrier substantially coincides with the transporting direction of the carriers in the transport system, visual inspection means for inspecting external characteristics of the individual poultry animals transported by the transport system, and a device for conditioning poultry as described above, wherein the visual inspection means are disposed in the transporting direction upstream of the device for conditioning poultry such that the functioning of the device for conditioning poultry can be controlled selectively on the basis of the data collected by visual inspection. It is thus possible to condition, or partially condition, for instance by conditioning only the wings or only the legs, only those poultry animals for which such a further processing is worthwhile. An example hereof is formed by chickens which are sold as whole product; it is here worthwhile to condition the legs, while conditioning is not usually worthwhile for chickens which are divided into smaller pieces in a subsequent sub-line. Selective use of the device for conditioning poultry can be obtained by making the operation of the device subject to the recorded visual information (feed-forward process control). Conversely, it is also possible to first divide the supply of poultry into different sub-flows of slaughtered poultry, these sub-flows being further processed in different ways. One or more devices for conditioning poultry can then still be disposed in one or more sub-flows. In this variant there is feed-forward, on the basis of the visual information, to the selection means which divide the main flow of products into two or more sub-flows.

The invention will be further elucidated on the basis of the non-limitative exemplary embodiments shown in the following figures. Herein:

Figure 1A:
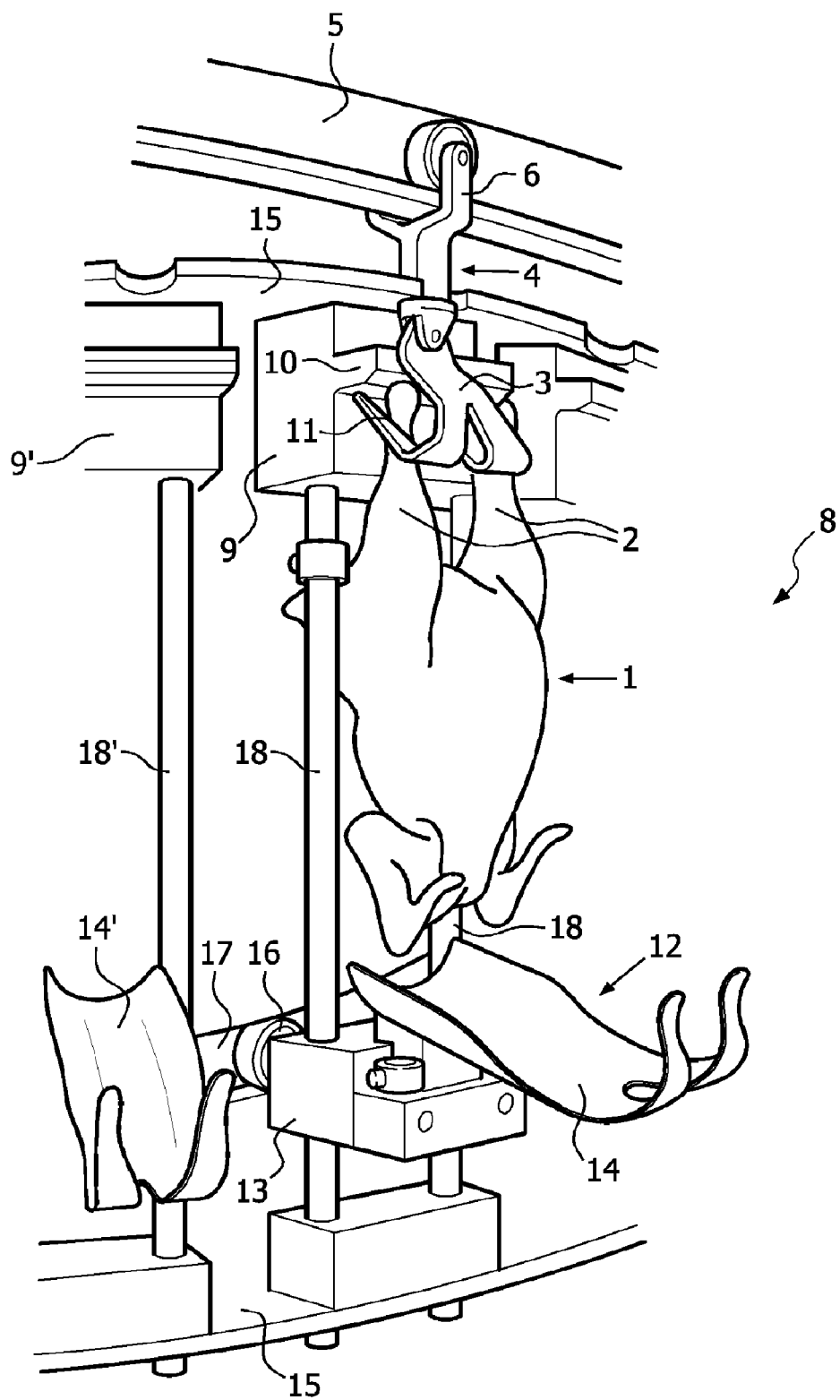
FIGS. 1A-1D show perspective views of successive processing stages of a device according to the invention for conditioning the legs of a poultry animal hanging in an overhead conveyor.

FIG. 1A shows a carcass 1 of a poultry animal, more particularly a chicken, which is suspended by means of legs 2 in a rigid transport hook 3 which functions as carrier of a transport system 4. Transport system 4 comprises, among other parts, a guide track 5 in which is carried a hook carrier 6 which bears hook 3. In order to prevent legs 2 detaching from hook 3, the shown conditioning device 8 is provided with locking block 9, a protruding edge 10 of which ensures that there is no space for legs 2 to come out of engaging openings 11. Situated under chicken 1 is an engaging element 12 which is carried by a vertically displaceable carriage 13. Engaging member 12 is provided with a concave contact surface 14 which, as will be shown in the following figures, can be moved upward and thus function as a pusher. In the embodiment variant shown in this figure the locking block 9 and engaging element 12 form part of a carousel 15. By rotating carousel 15 a cam roller 16 connected to carriage 13 is carried through a cam track 17, as a result of which the desired upward (and, later in the rotation path, downward) movement is obtained. Carriage 13 is guided by vertical guide rods 18. FIG. 1A also shows a subsequent locking block 9', a subsequent contact surface 14' and a subsequent guide rod 18', which form a subsequent processing station in carousel 15.

Figure 1B:
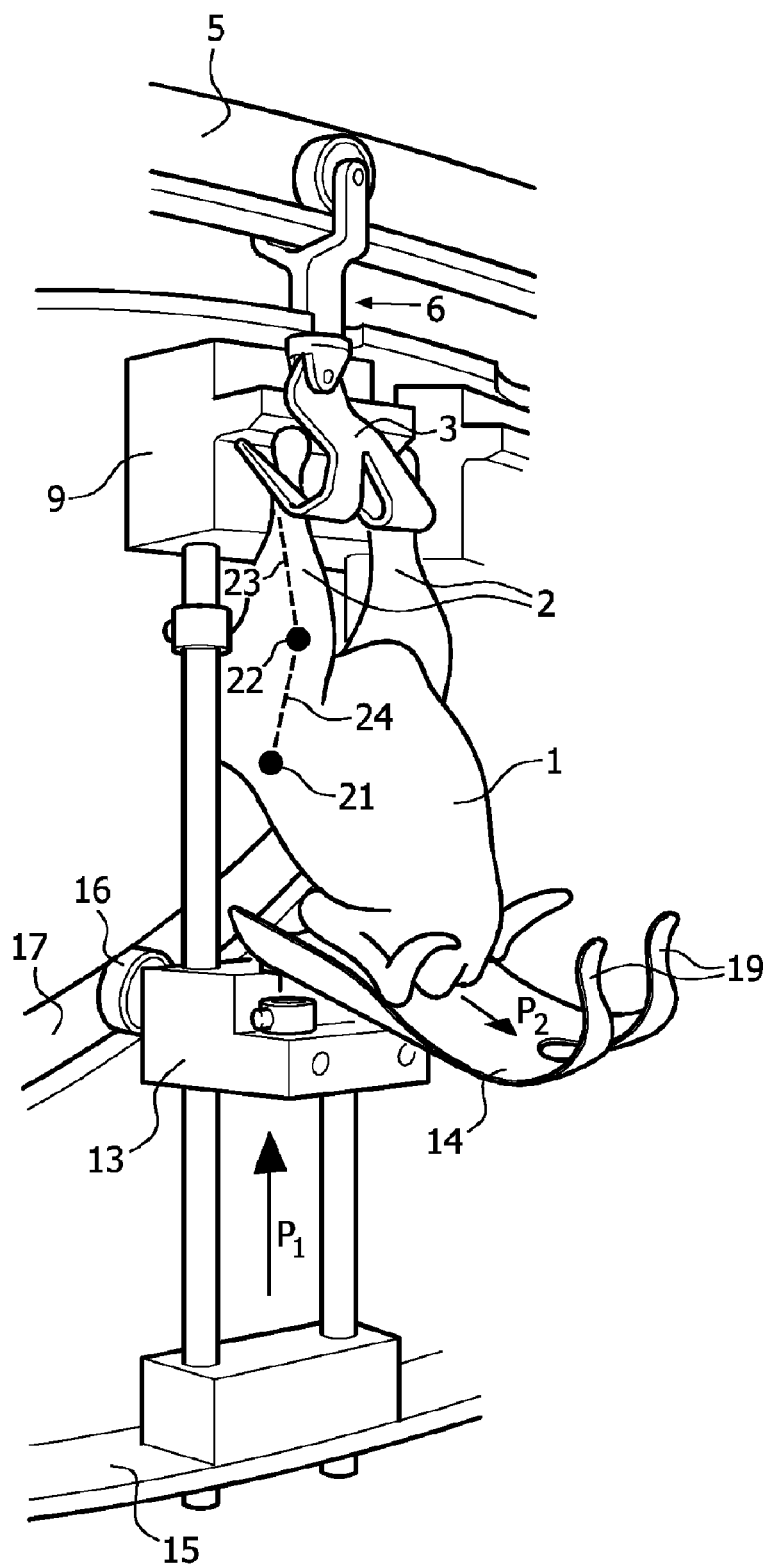
Figure 1C:
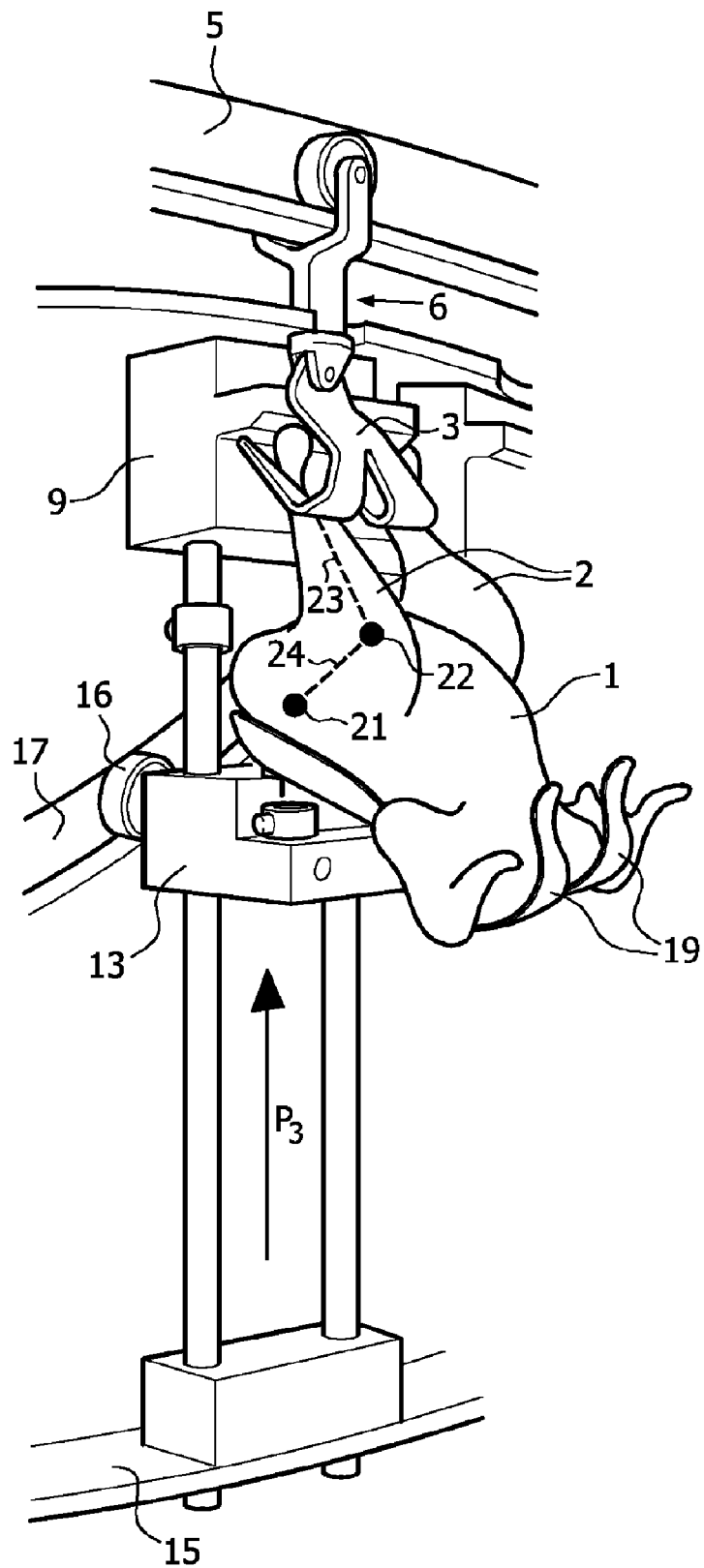
Figure 1D:
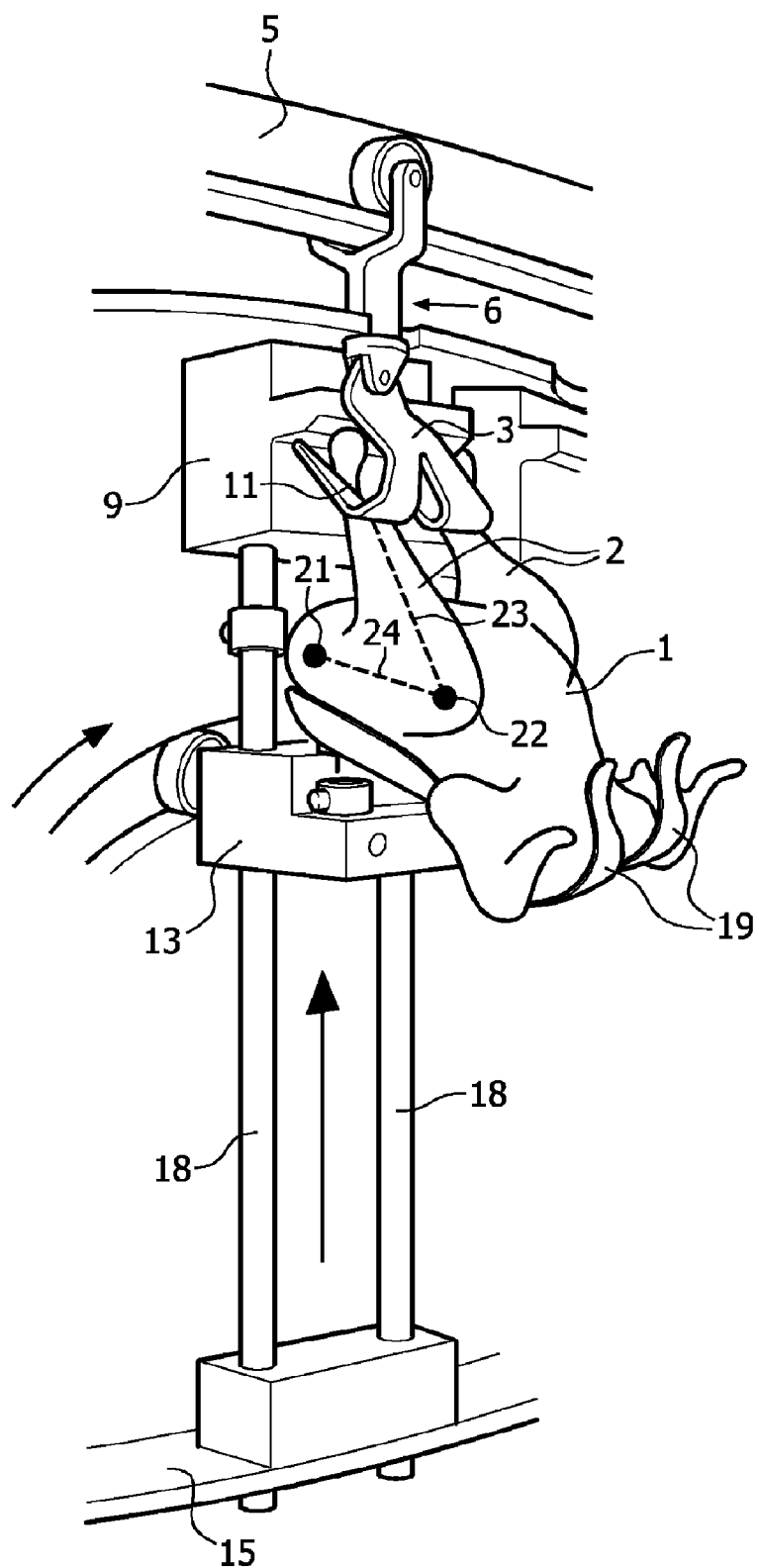

FIG. 1B shows conditioning device 8 of FIG. 1A in a situation where carriage 13 has moved upward as according to arrow $P_1$ as a result of the rising cam track 17 and resulting upward movement of cam roller 16. Contact surface 14 hereby comes into contact with chicken 1. Chicken 1 will hereby slide over contact surface 14 as according to arrow $P_2$. As already shown to a limited extent in FIG. 1B, as carriage 13 with contact surface 14 proceeds further upward (see FIG. 1C, arrow $P_3$) the chicken will slide over the contact surface such that the shoulders of chicken 1 are moved toward two stops 19 until, as shown in FIG. 1C, they lie against these stops 19. Chicken 1 will then slide no further over contact surface 14 when carriage 13 is moved still further upward. As a consequence of chicken 1 sliding over contact surface 14 and contact surface 14 moving still further upward once chicken 1 lies against stops 19, the position of legs 2 is changed. The result hereof is that the hip-joint (Articulatio Coxae) 21 and the knee-joint (Articulatio Femoropaterallis) 22 are rotated more and more until the position as shown in FIG. 1D is finally obtained. The position of hip-joint 21, knee-joint 22, splint bone (fibula) 23 and thighbone (femur) 24 are shown schematically by means of a broken line. Legs 2 are folded so far together in FIG. 1D that later in the process they can be returned more easily (i.e. with less resistance than before) to this position. Also apparent from FIG. 1D is the importance of the presence of locking block 9. The deformation of legs 2 can take place in this manner without the legs coming out of the engaging openings 11 of hook 3, with the undesirable result that they do not undergo the desired processing. After passing through the positions as shown in FIGS. 1A-1D, engaging element 12 will be carried back again to the starting position shown in FIG. 1A.

Figure 2A:
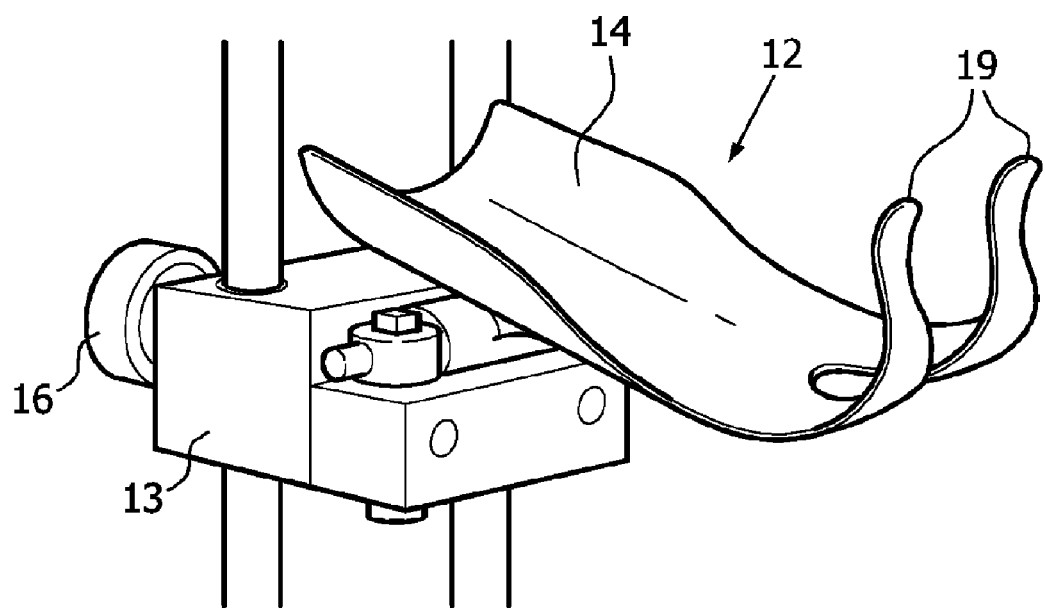
FIGS. 2A-2D show perspective views of four embodiment variants of engaging elements for pushing chickens upward in a device according to the present invention.

FIG. 2A shows a first embodiment variant of engaging element 12 for pushing chickens upward corresponding with that shown in FIGS. 1A-1D. Contact surface 14 takes a concave form such that a chicken will take up the desired position relative to contact surface 14 in self-locating manner. Stops 19 have also already been described above Contact surface 14 is mounted in a fixed position on carriage 13 with which the vertical upward pushing movement is realized.

Figure 2B:
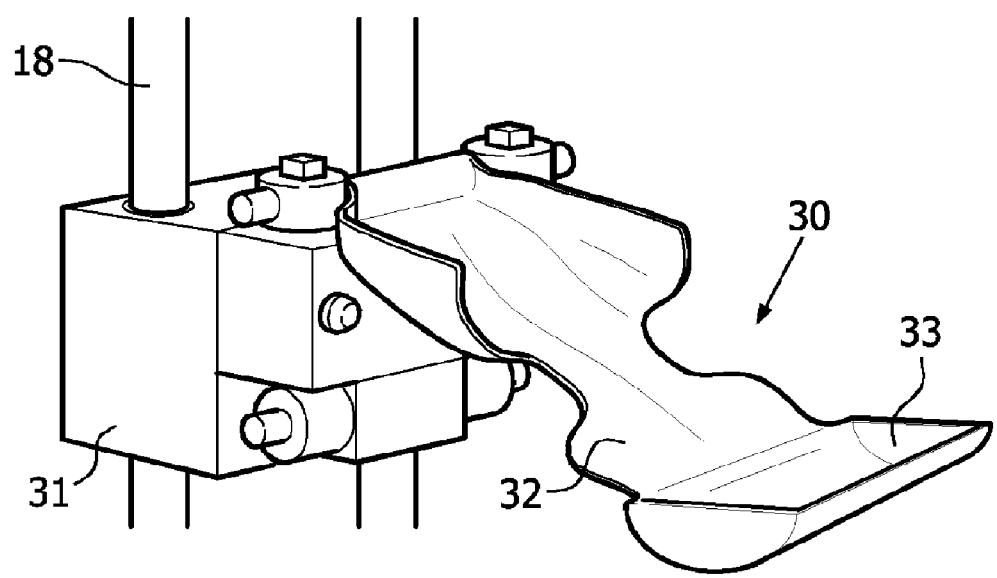

FIG. 2B shows a second embodiment variant of an engaging element 30 which is provided with a vertically displaceable carriage 31. Engaging element 30 has a contact surface at 32 with a stop 33 for arresting chickens sliding over contact surface 32.

Figure 2C:
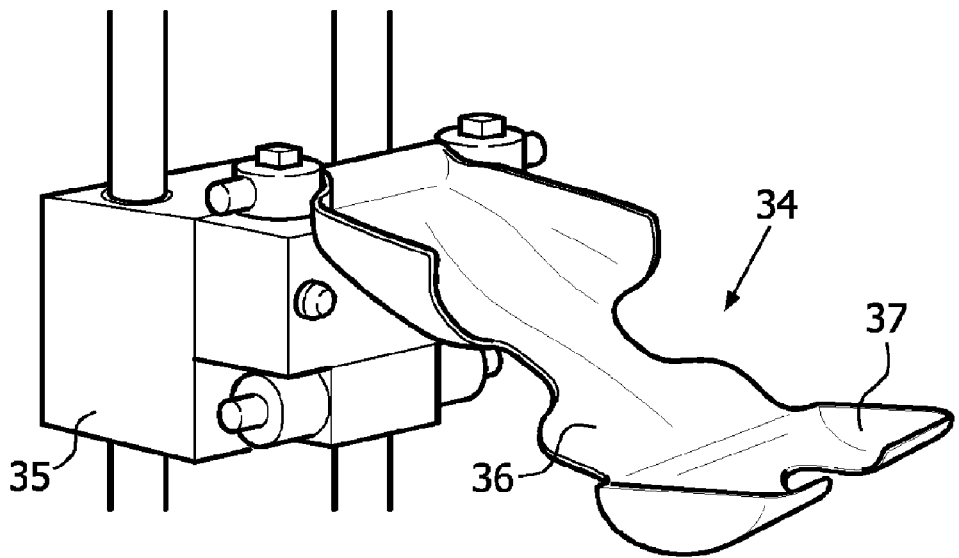

FIG. 2C shows a third embodiment variant of an engaging element 34 provided with a vertically displaceable carriage 35. Engaging element 34 has a contact surface 36 with a stop 37. Stop 37 is provided here with a centrally placed recess in order to prevent damage to a possibly remaining neck part.

Figure 2D:
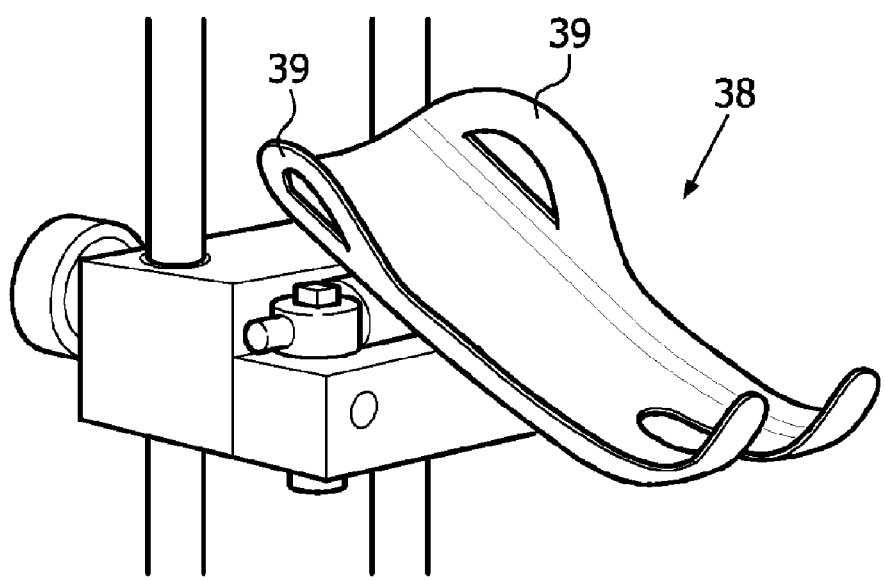

FIG. 2D shows a fourth embodiment variant of an engaging element 38 which, in addition to the components as already shown in the above three embodiment variants of an engaging element 12, 30, 34, which are therefore not stated here again, now comprises two additional supporting elements 39 with which the thighs of a chicken for processing are engaged sideways, i.e. on sides of the thighs remote from each other, which can also be designated the outer sides of the thighs, if they tend to move apart under the influence of the upward pressing. It is thus possible to prevent particularly the hip-joint (Articulatio Coxae) 21 rotating sideways (FIG. 1B).

Figures 3A, 3B:
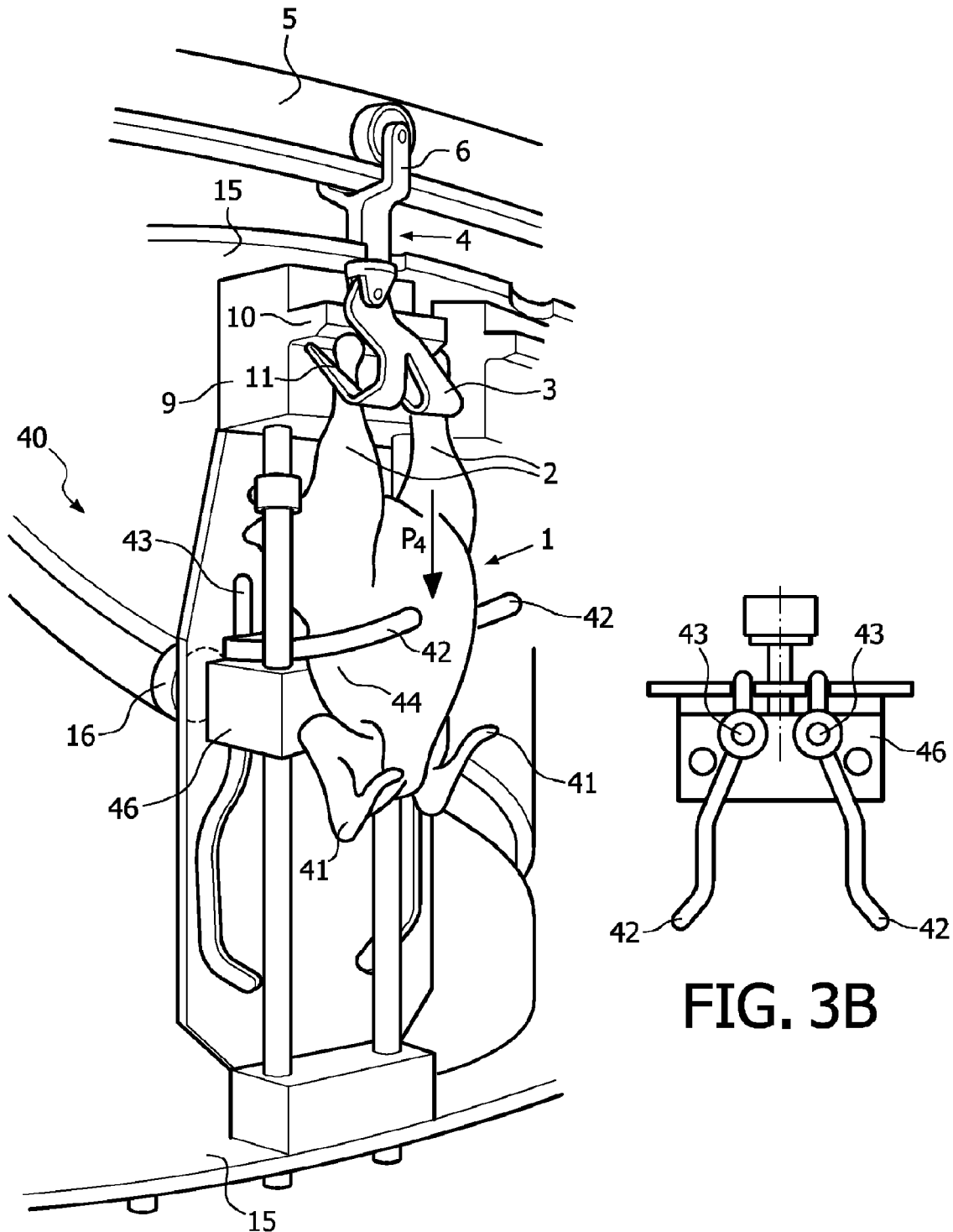
FIG. 3A is a perspective view of an alternative embodiment variant of a device according to the invention for conditioning the wings of a poultry animal hanging in an overhead conveyor.
FIG. 3B is a top view of a part of the device as shown in FIG. 3A.

FIG. 3A shows a perspective view of a device 40 according to the invention for conditioning the wings 41 of a chicken 1 suspended in an overhead conveyor 4. Similarly to that shown in FIGS. 1A-1D, legs 2 are suspended in a rigid transport hook 3 which functions as carrier of transport system 4. Transport system 4 comprises, among other parts, a guide track 5 in which is carried a hook carrier 6 which bears hook 3. Conditioning device 40 is also provided with two wing folding members 42. These two wing folding members 42 are mounted rotatably around two vertical rotation shafts 43 on a vertically displaceable carriage 44. For a description of the operation of carriage 44 reference is made to the above description of carriage 13 as shown in FIGS. 1A-1D, with the proviso that cam roller 16 in carriage 44 not only operates the vertical displacement of carriage 44 but also drives the pivoting of wing folding members 42 toward and away from each other. Just as conditioning device 8 shown in FIGS. 1A-1D, conditioning device 40 shown in this figure also forms part of a carousel 15. Conditioning device 40 can otherwise also be modified in relatively simple manner by also making the wing folding members 42 rotatable around a horizontal shaft (not shown in figure). Wing folding members 42 can then also be used in their position pivoted toward each other to push chicken 1 upward, more specifically at the position of the hips of chicken 1.

The operation of conditioning device 40 is as follows. Wing folding members 42 are carried in pivoted-apart position to about the level of the position in which they are situated in FIG. 3A. Wing folding members 42 are then pivoted toward each other such that they lie against the sides 44 of chicken 1. Carriage 46 with wing folding members 42 will then be moved downward as according to arrow $P_4$, as a result which the wing folding members 42 will slide between wings 41 in sides 44 of chicken 1. This downward movement as according to arrow $P_4$ is now continued further, and wing folding members 42 thus urge wings 41 outward into a spread-apart position. A part of carriage 44 with wing folding members 42 is shown in top view in FIG. 3B.

Figure 4A:
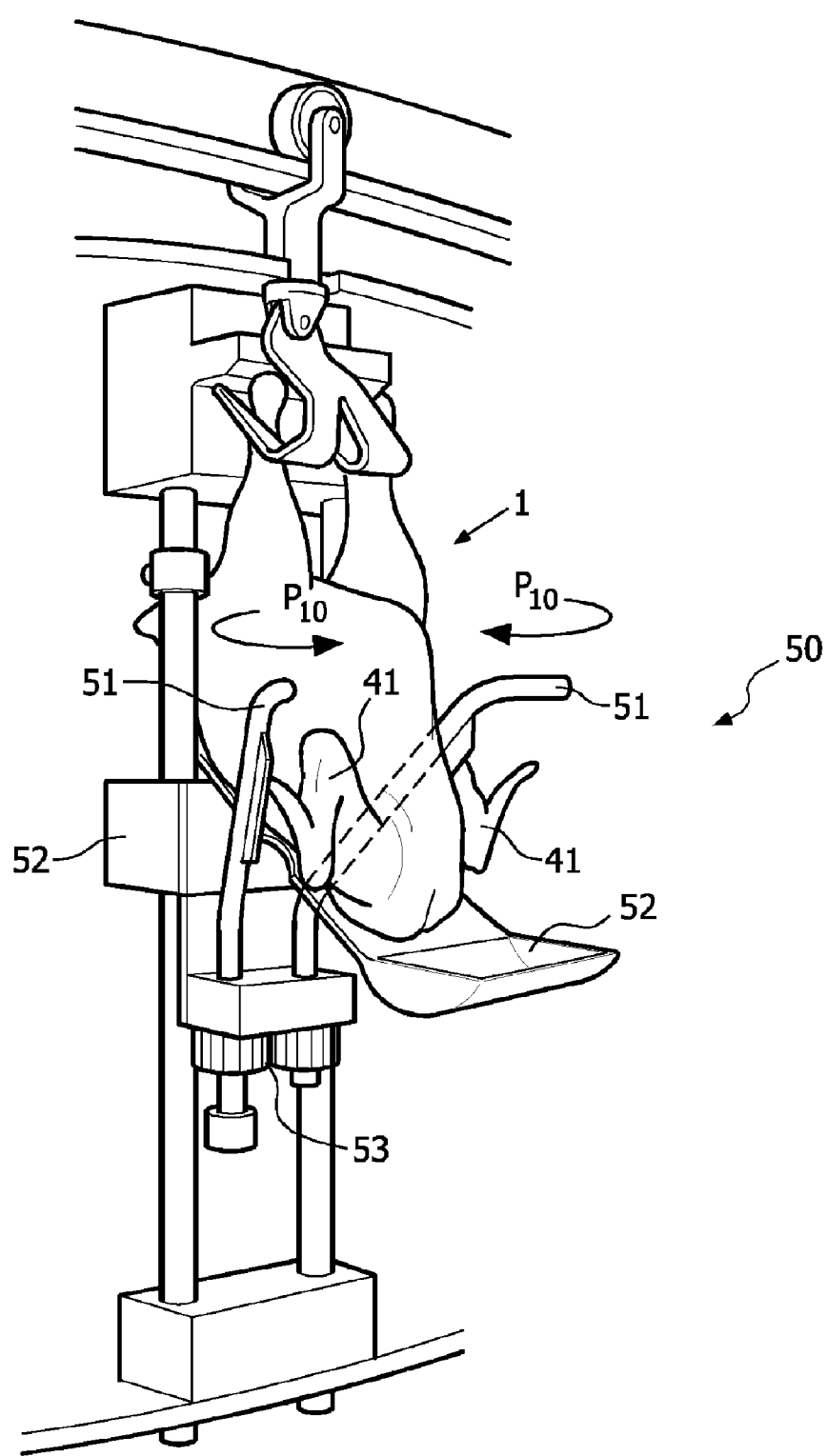
FIGS. 4A-4D show perspective views of successive processing stages in the spreading of wings using a following embodiment variant of a conditioning device according to the invention.
Figure 4B:
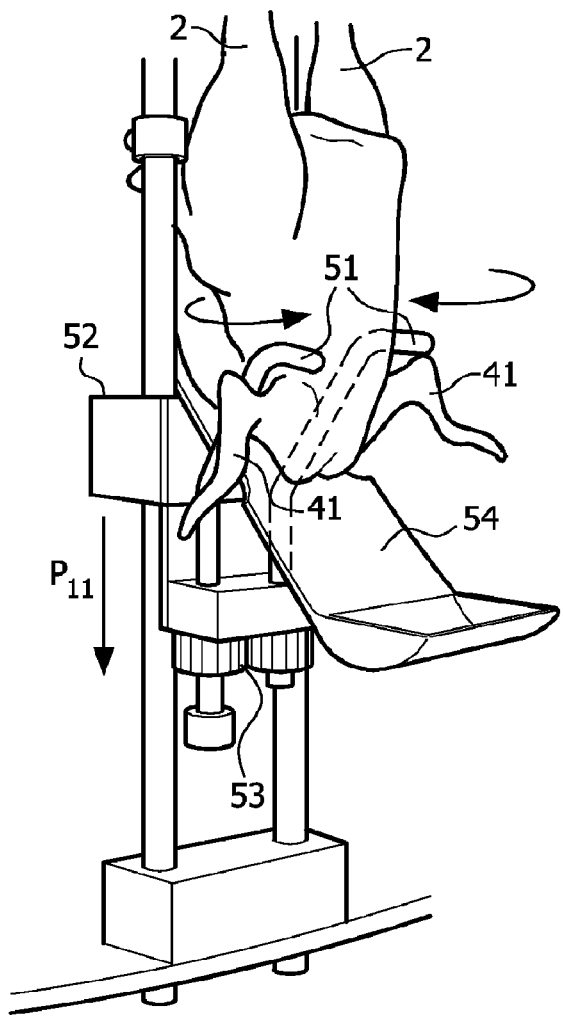
Figure 4C:
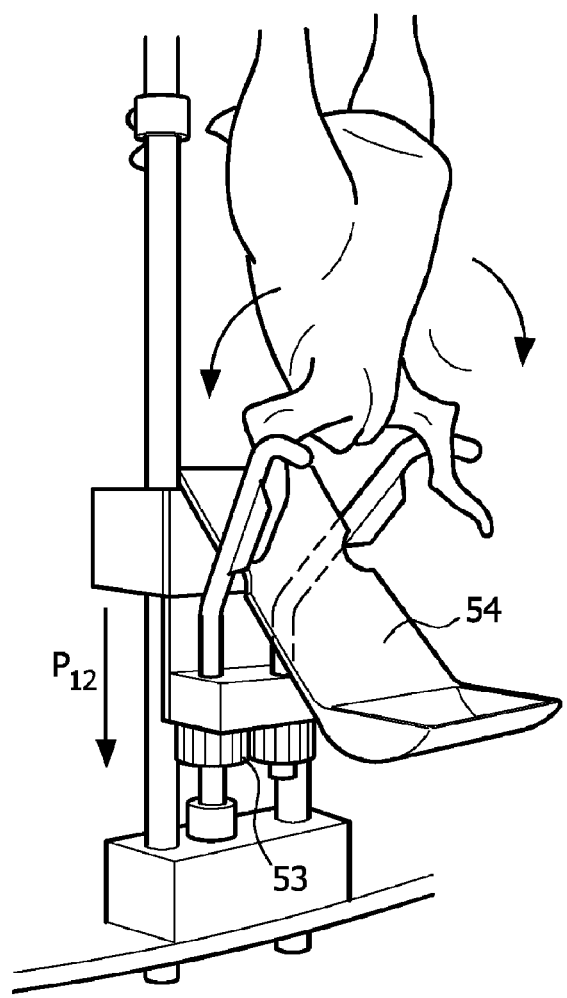

FIG. 4A shows a conditioning device 50 with a combined functionality comparable to that of conditioning device 8 as shown in FIGS. 1A-1D and that of conditioning device 40 as shown in FIG. 3A. Device 50 is also provided with two wing folding members 51 for engaging on and conditioning the wings 41 of chicken 1. In the embodiment variant shown here however, wing folding members 51 are driven by a drive mechanism 53 arranged on the underside of a carriage 52. In the position shown in FIG. 4A the wing folding members 51 are pivoted toward each other as according to arrows $P_{10}$ by drive mechanism 53 until they come to lie against the sides of chicken 1. FIG. 4B shows a subsequent processing stage in which carriage 52 is moved downward as according to arrow $P_{11}$. Wings 41 are hereby urged apart and a distance away from the body of chicken 1. FIG. 4C shows the subsequent stage in which carriage 52 is moved still further downward as according to arrow $P_{12}$. Wing folding members 51 have now fulfilled an important part of their function; wings 41 have already been urged outward and wing folding members 51 are pressed apart to a limited extent (see arrow $P_{13}$) such that they can be moved further downward over wings 41. In order to begin again with a following processing step as shown in FIG. 4A, wing folding members 51 will be pivoted still further apart so that carriage 52 can be moved upward. As the carriage moves upward, a pusher 54 will push chicken 1 upward in accordance with the description relating to FIGS. 1A-1D. It is thus possible using conditioning device 50 to condition both wings 41 and legs 2 of chicken 1.

Figure 4D:
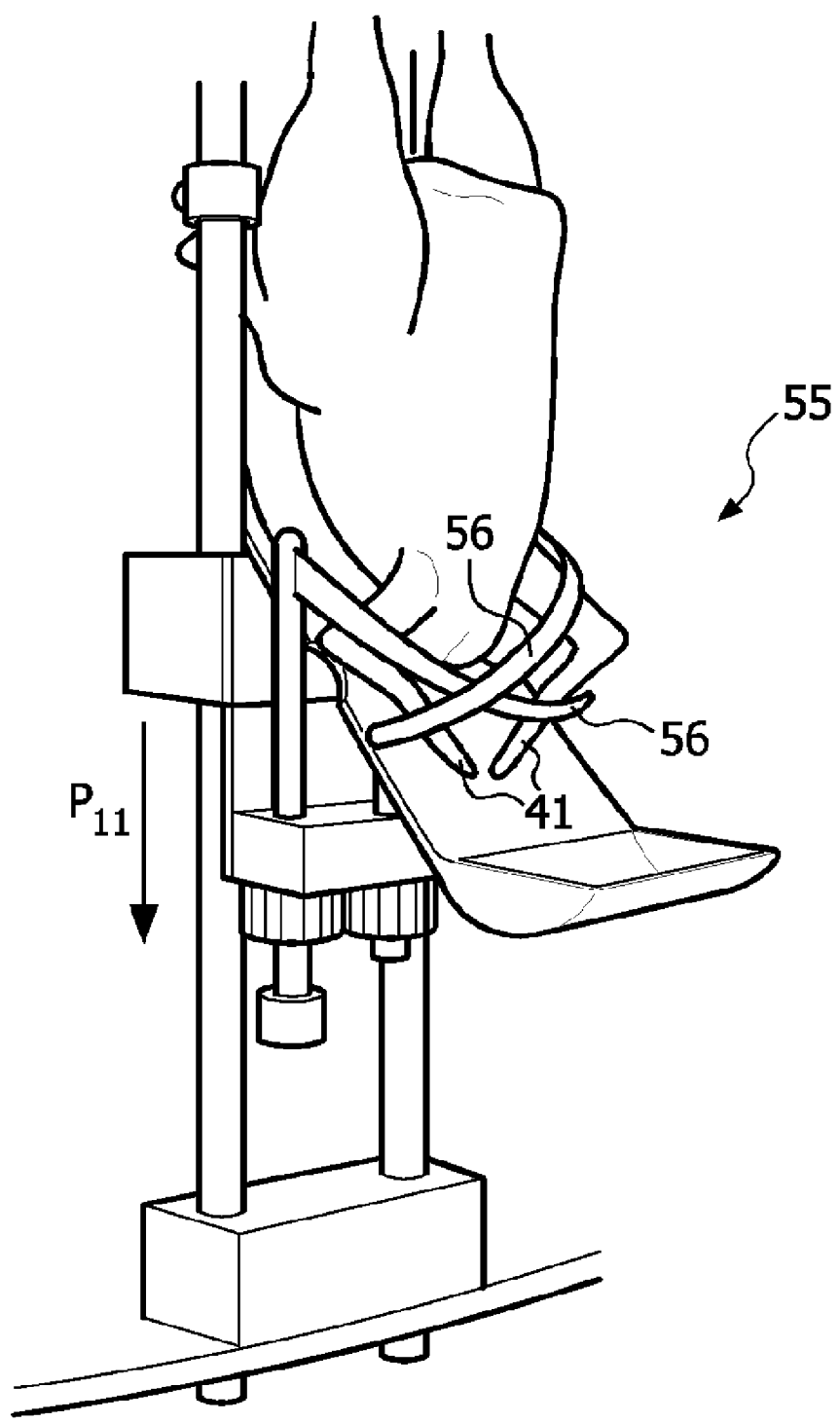

FIG. 4D shows an alternative embodiment variant of a conditioning device 55 in which the components corresponding to conditioning device 50 according to FIGS. 4A-4C are not referred to again. The two wing folding members 56 in particular differ from the form of the above discussed wing folding members 51. In addition to the fact that wing folding members 56 have a flattened form, they are also displaceable relative to each other such that they overlap (or cross) each other. Wings 41 are now fully enclosed by wing folding members 56 and can therefore only be released when wing folding members 56 are moved so far downward as according to arrow $P_{11}$ that they have passed fully over the wings (including the wing ends or wing tips).

Figure 5A:
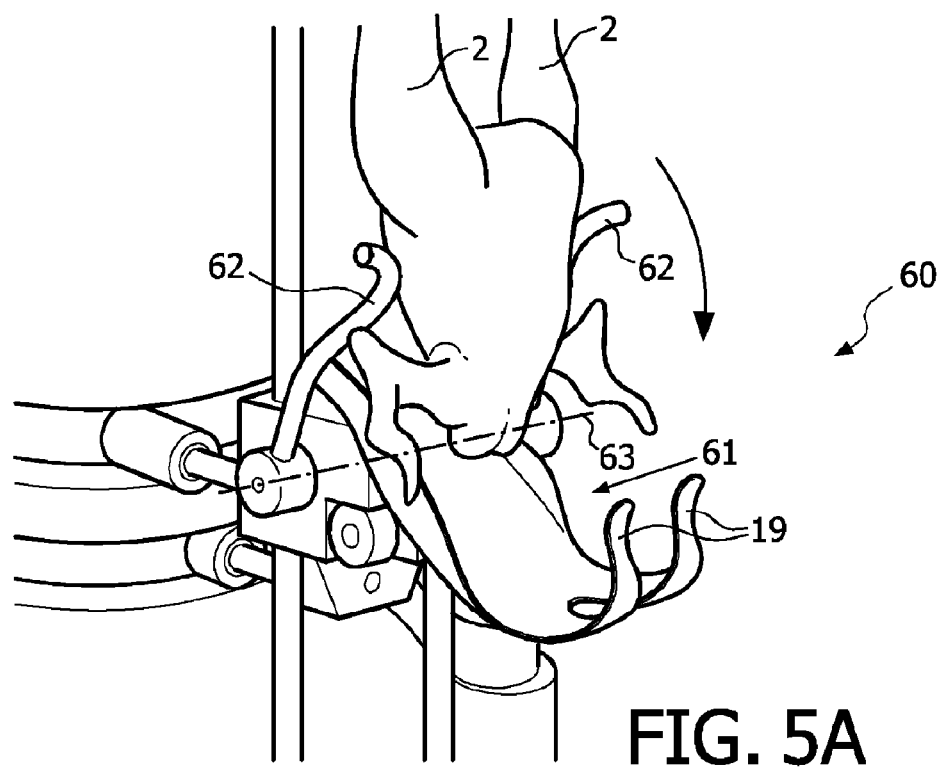
FIG. 5A is a perspective view of a second embodiment variant of a conditioning device with a dual functionality.
Figure 5B:
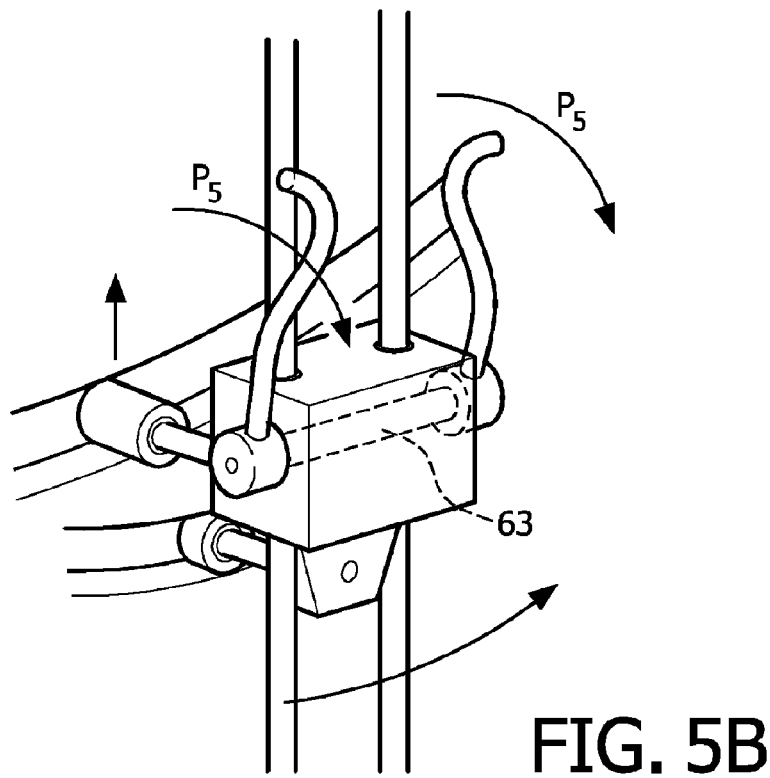
FIG. 5B is a view of a part of a conditioning device as a component of the device shown in FIG. 5A, which can however be applied individually.

FIG. 5A shows yet another embodiment variant of a positioning device 60 with a combination of a pusher 61 and wing folding members 62. These wing folding members 62 are also shown separately in FIG. 5B. The operation of pusher 61 corresponds to that of the above described pushers. Wing folding members 62 however operate differently from the above shown embodiment variants. As shown in FIG. 5B, wing folding members 62 are pivotable as according to arrows $P_5$ around a shaft 63 running parallel to the suspension positions of legs 2. That is, the distance between wing folding members 62 remains more or less constant during pivoting.

Figure 6A:
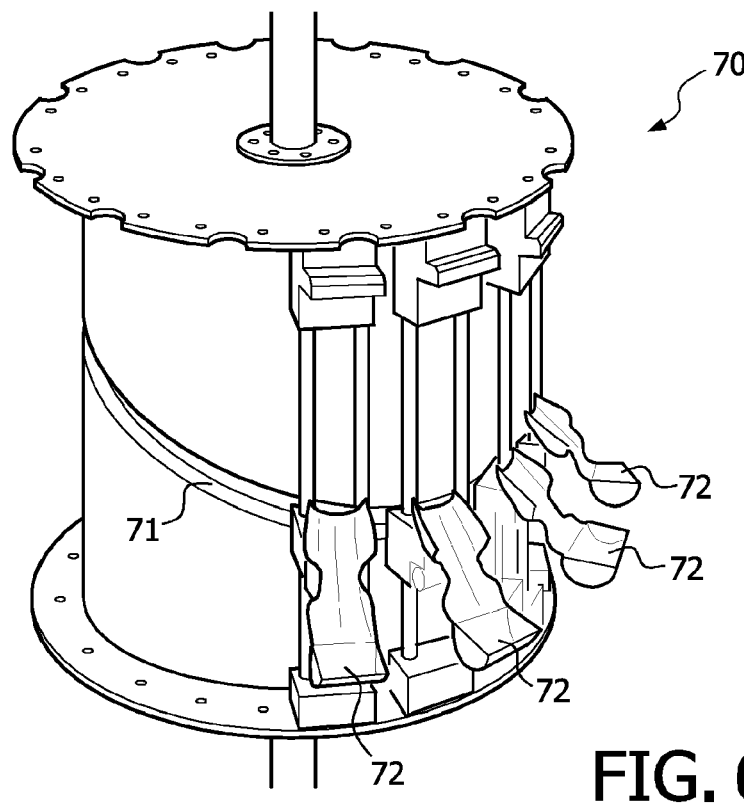
FIGS. 6A-6D show schematic perspective views of a number of possible concepts of the rough architecture of the device according to the invention.

FIGS. 6A-6D show schematically a number of concepts of the rough architecture of the device. FIG. 6A thus shows in partially cut-away view a carousel 70 provided with a cam groove 71. The position of pushers 72 here depends on the angular position taken up by a specific press-an element 72 relative to cam groove 71. The rotation of carousel 70 provides the controlled vertical displacement of pushers 72.

Figure 6B:
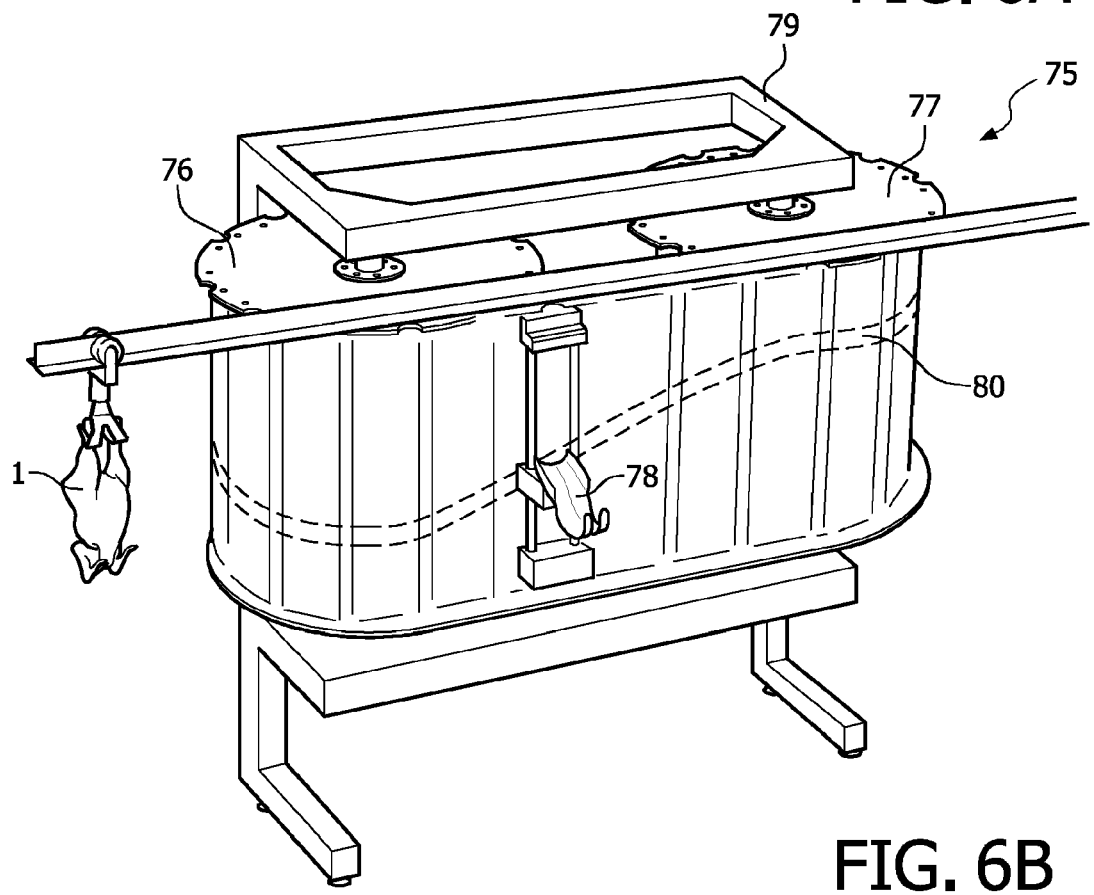

FIG. 6B shows a work station 75 in which pushers 78 (only one of which is shown in the figure) pass through an endless path by means of two rotating cylinders 76, 77. A cam track 80 held stationary by a frame 79 provides for the position-controlled vertical displacement of pushers 78. The supply of a chicken 1 in an overhead transport system is also shown clearly in this figure.

Figure 6C:
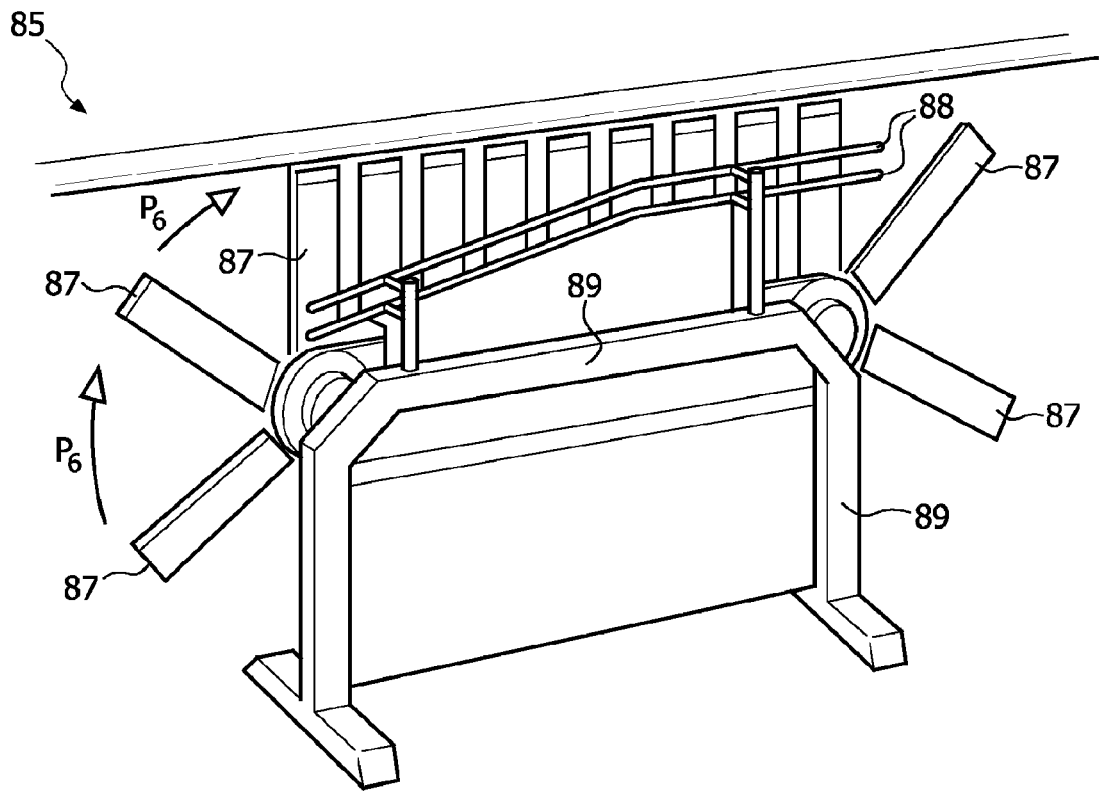
Figure 6D:
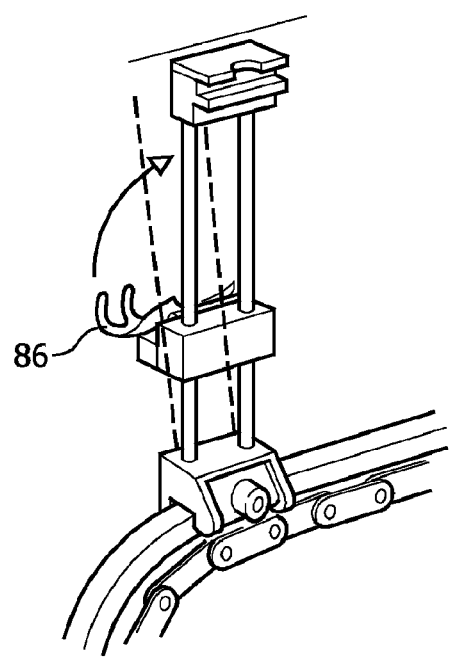

FIGS. 6C and 6D show a work station 85 in which pushers 86 are mounted on element carriers 87 which pass (as according to arrows $P_6$) through an endless path lying in a vertical plane. A cam track 88 is once again connected in stationary manner to a frame 89 forming part of work station 85.

Figure 6E:
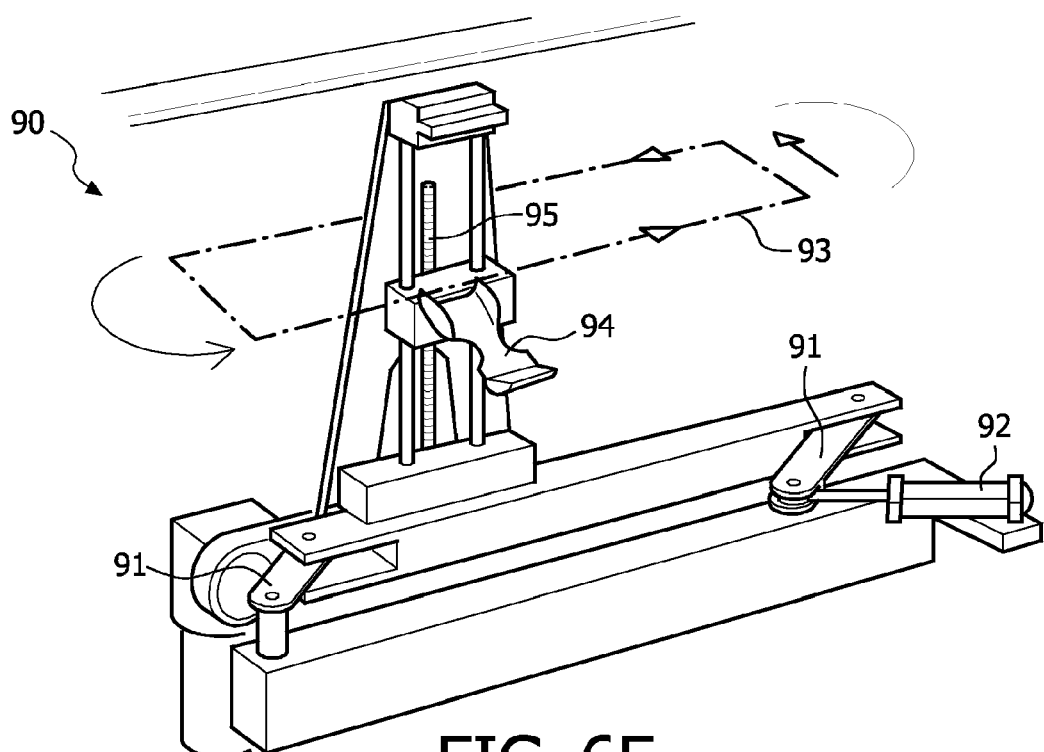

FIG. 6E shows a work station 90 which, by means of a rod assembly 91 and a drive cylinder 92, follows an intermittent path 93 as indicated with a dash-dot line. The driving of a pusher 94 now takes place by means of a drive spindle 95.

Figure 6F:
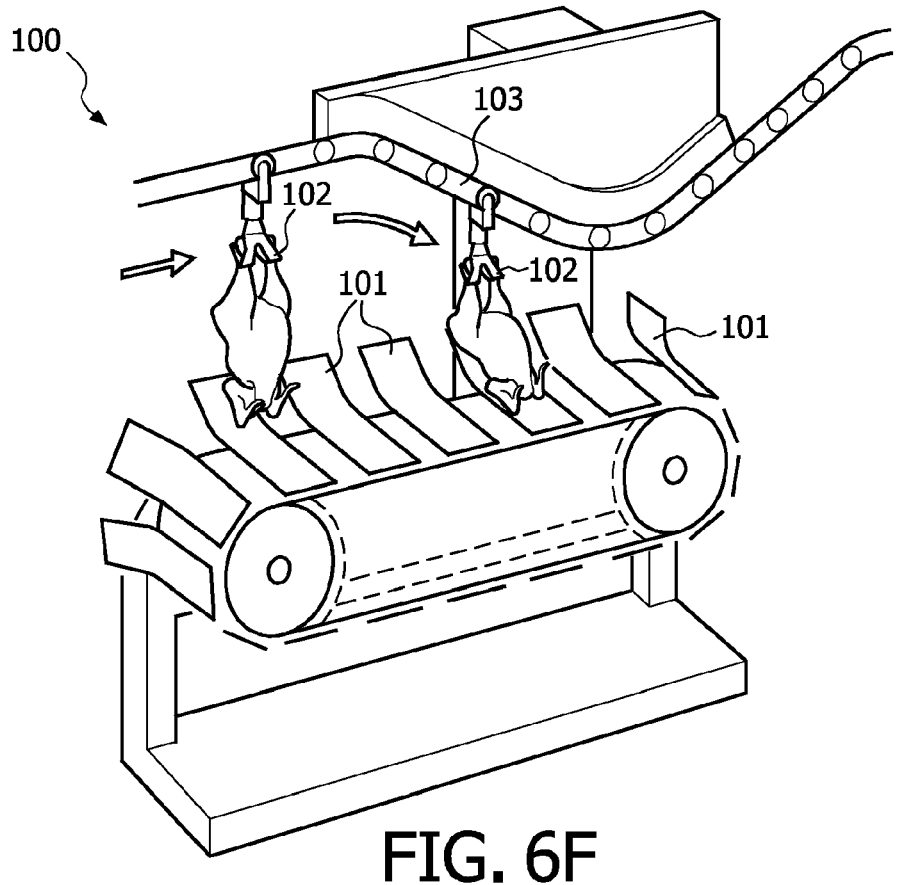

FIG. 6F shows a work station 100 wherein pushers 101 follow an endless path and the mutual distance between hooks 102 and pushers 101 is varied by the progression of a guide track 103 along which the hooks 102 are carried.

Figure 7A:
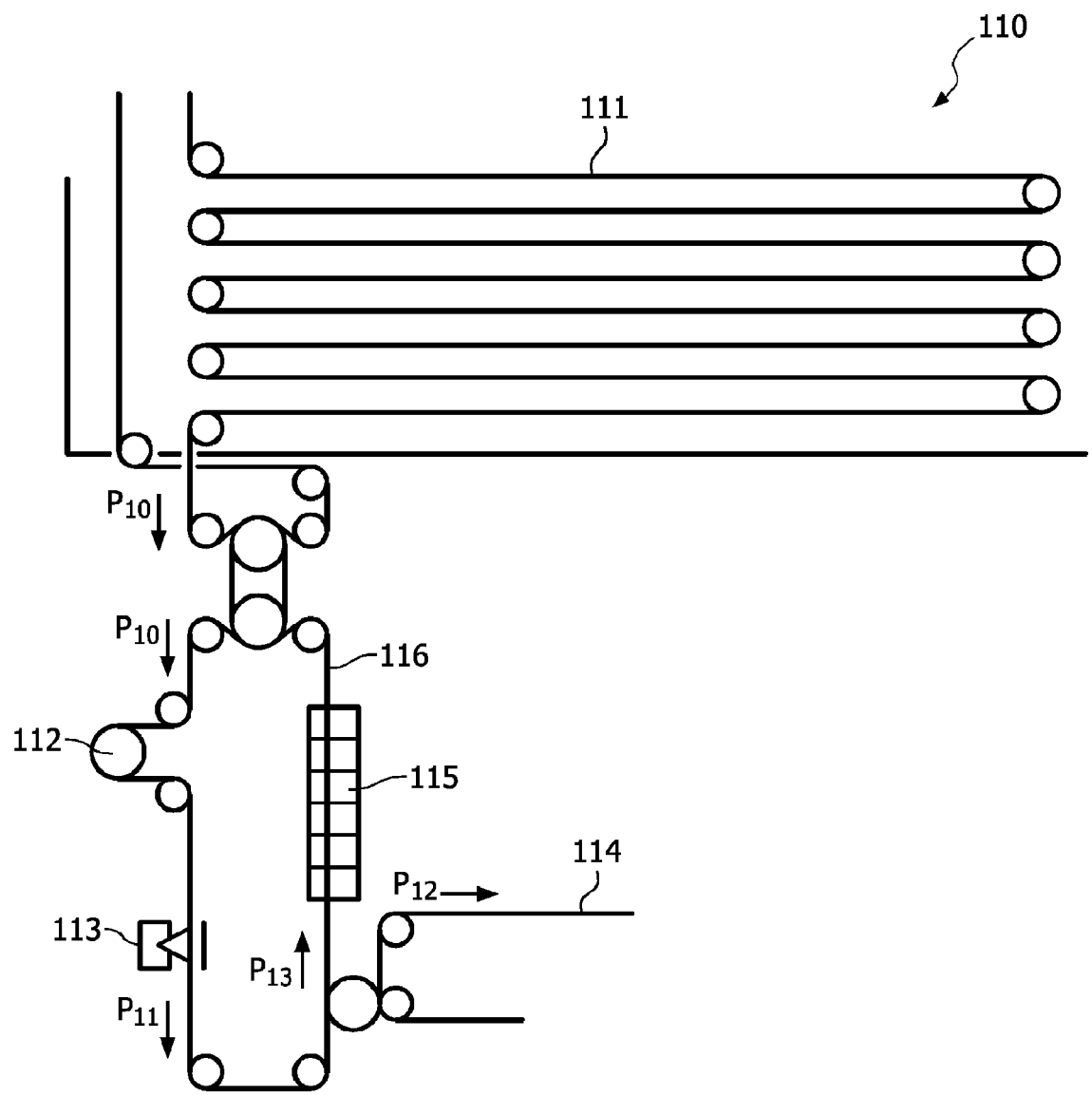
FIGS. 7A-7C show schematic top views of three embodiment variants of production lines according to the present invention for processing poultry carcasses transported hanging in carriers.

FIG. 7A shows a part of a production line 110 with a cooling line 111 from which the cooled poultry is supplied as according to arrow $P_{10}$. In a transfer means 117 the hanging position of the poultry is changed from cooling line 111 to a subsequent transport system. In a conditioning device 112 the thus supplied poultry animals are all carried through a conditioning device 112 as described above. The legs and/or wings of all supplied poultry animals can thus be conditioned. Following on from conditioning device 112 a quality control of all supplied poultry animals takes place with a camera system 113. Because of the conditioning 112 preceding the visual quality control 113 the reliability of the quality control 113 is relatively high. As indicated with arrow $P_{11}$, the inspected poultry animals are moved further and, subject to the quality detected at the quality control 113, are discharged partially along a disassembly line 114 (see arrow $P_{12}$), while a second fraction is guided as according to arrow $P_{13}$ to an ejection system 115 for whole poultry animals. The part 116 of the conveyor belt which is empty after the ejection system 115 is guided back for renewed loading with fresh poultry animals to be cooled and disassembled.

Figure 7B:
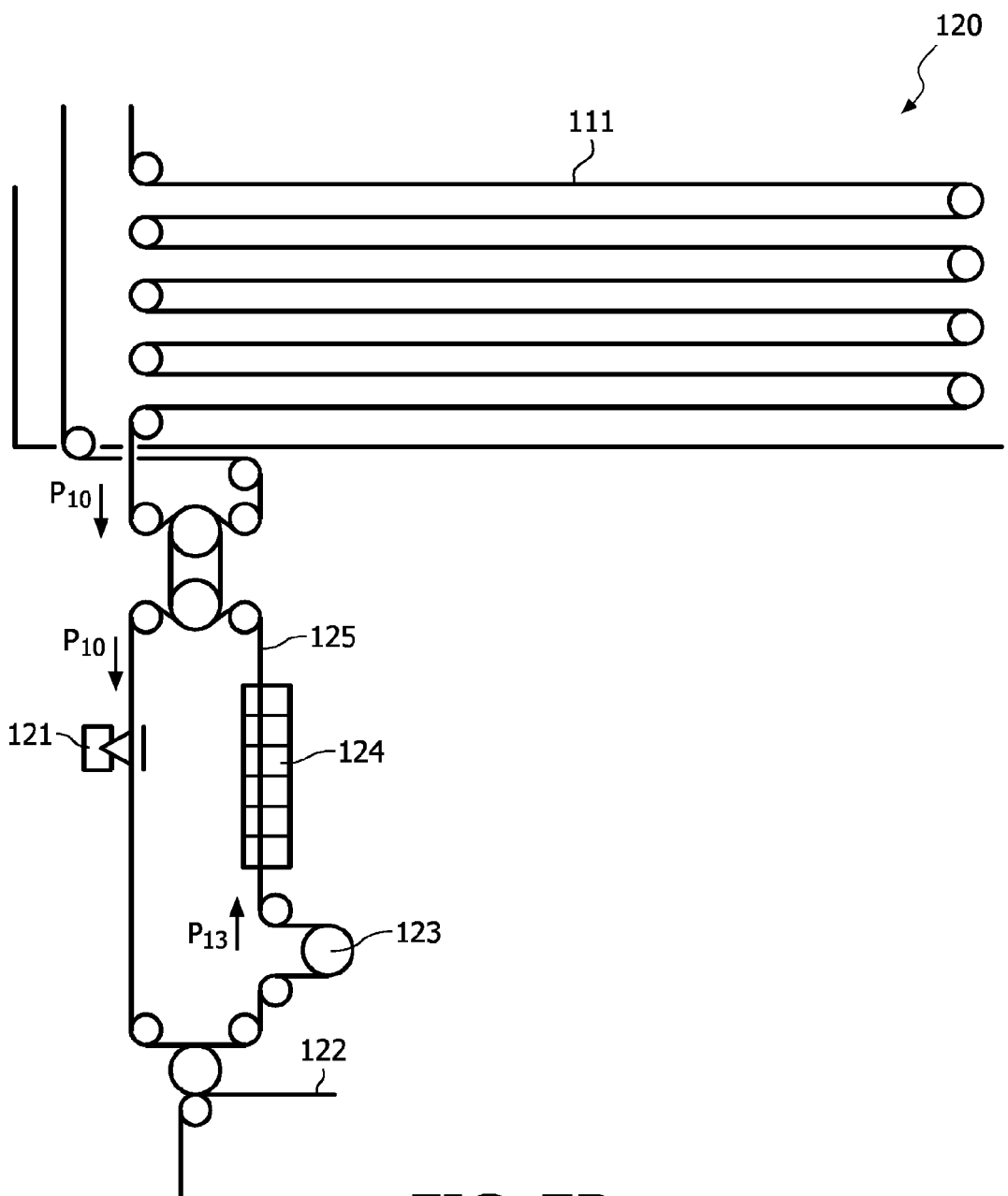

FIG. 7B shows a production line 120 with the above shown cooling line 111 from which the cooled poultry is once again supplied as according to arrow $P_{10}$. The poultry animals are supplied immediately following cooling line 111 to a system for visual quality control 121 (for instance a vision system). A fraction of the thus inspected poultry animals is discharged to a disassembly line 122 and the remaining fraction is supplied to a conditioning device 123 according to the present invention and finally passed (see arrow $P_{13}$) to an ejection system 124 for whole products. The part 125 of the conveyor belt which is empty following ejection system 124 can once again be guided back. The advantage of this production line is that only the fraction of the poultry animals here undergo a conditioning process for which conditioning of the legs is important in improving the working conditions in the further processing of the poultry animals not to be disassembled. Conditioning device 123 is therefore not loaded excessively.

Figure 7C:
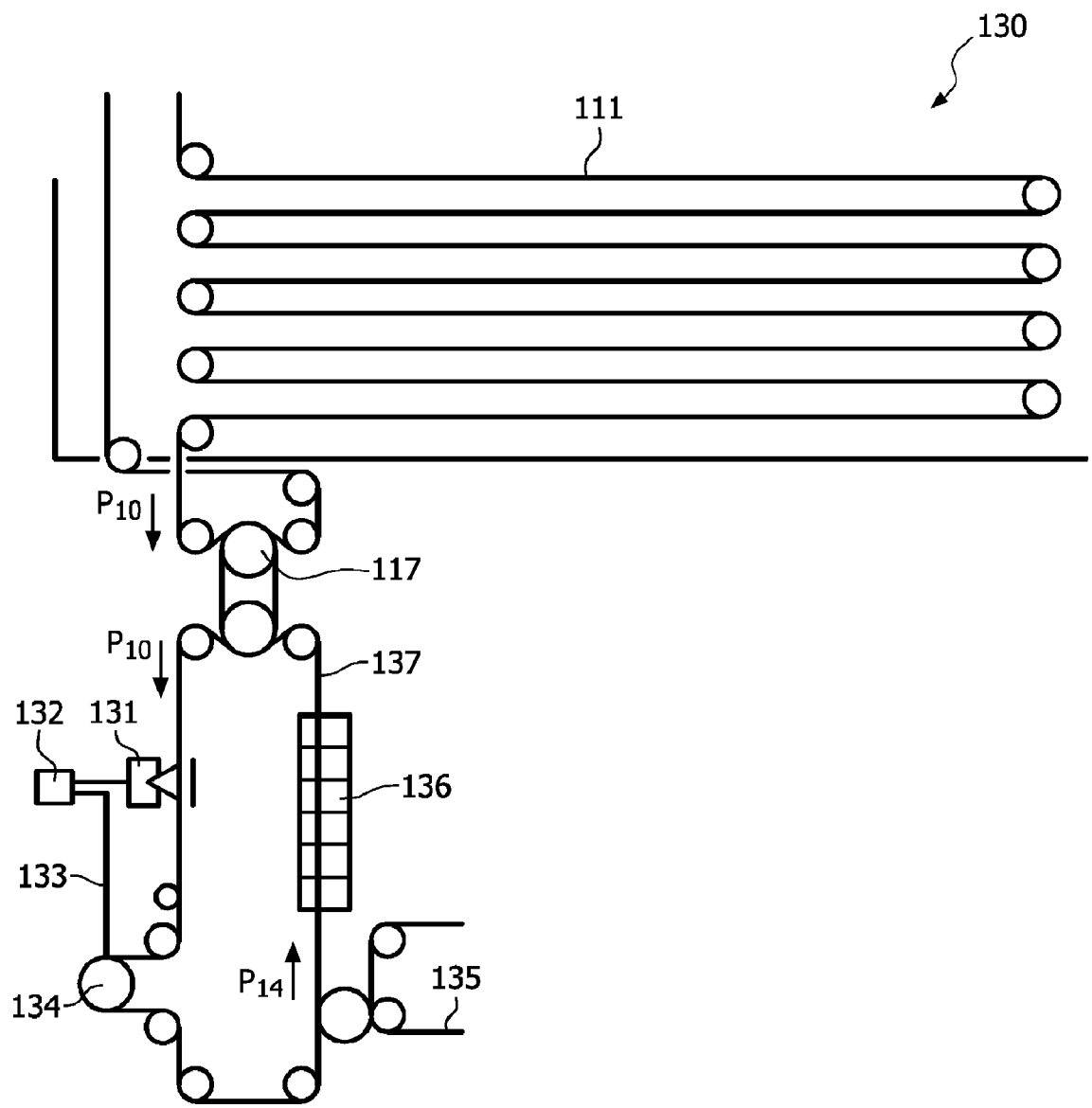

FIG. 7C finally again shows production line 130 with cooling line 111 from which the cooled poultry is supplied as according to arrow $P_{10}$. The poultry animals are supplied immediately following cooling line 111 to a system for visual quality control 131. The results of the quality control 131 are processed by a computer 132 and transmitted by means of a control line 133 to a conditioning device 134. Computer 132 provides for a selective processing of the poultry animals in conditioning device 134. That is, only the poultry animals which it is worthwhile subjecting to a wing and/or leg conditioning. A fraction of the poultry animals is then discharged to a disassembly line 135 and the remaining fraction is passed (see arrow $P_{14}$) to an ejection system 136 for whole products. The selection of poultry animals to respectively disassembly line 135 and ejection system 136 will be controlled by computer 132. The part 137 of the conveyor belt which is empty following ejection system 136 can once again be guided back.

The invention claimed is:

1. A device for conditioning slaughtered poultry, comprising:
    a carrier provided with a contact surface for locally engaging a first carcass part of a slaughtered poultry animal defined by two separate legs at a first position, wherein the carrier forms part of a transport system with which the poultry are displaced hanging in the carrier,
    an engaging element provided with at least one contact surface for locally engaging a second carcass part of the slaughtered poultry animal at least at a second position, and
    drive means for relatively displacing the carrier and the engaging element toward each other,
    wherein the drive means are to relatively displacing the carrier and the engaging element toward each other such that the first and second carcass parts move relative to each other, and the engaging element is a pusher with a contact surface directed toward the carrier, the contact surface having an inclining position such that the contact surface encloses an acute angle with the vertical through the carrier with which the carrier and the pusher move toward each other, such that an angular position of the second carcass part relative to the legs engaged by the carrier is changed due to a force exerted by the contact surface making a body of the slaughtered poultry animal shifting or sliding over the contact surface as the pusher moves inward.

2. The device as claim 1, wherein the carrier is advanced such that the straight line through the engaging positions of separate legs substantially coincides with the transporting direction of the carriers in the transport system.

3. The device as claimed in claim 1, wherein the carrier co-acts with locking means for locking the first carcass part in an engaged position in the carrier.

4. The device as claimed in claim 3, wherein the locking means comprise a guide part connected to the fixed world.

5. The device as claimed in claim 1, wherein the device is provided with additional pressing means which operate close to the carrier and using which leg parts can be displaced relative to the leg parts engaged by the carrier.

6. The device as claimed in claim 1, wherein the device comprises a carousel in which a plurality of carriers are held simultaneously.

7. The device as claimed in claim 1, wherein the pusher is provided with at least one stop on the side of the contact surface remote from the carrier.

8. The device as claimed in claim 1, wherein the engaging element comprises at least two wing folding members with a mutually variable distance.

9. The device as claimed in claim 8, wherein the wing folding members are provided with curved contact surfaces directed toward each other.

10. The device as claimed in claim 9, wherein the contact surfaces are substantially concave.

11. The device as claimed in claim 8, wherein the wing folding members are mounted pivotally on a shared carrier such that the mutual distance between the contact surfaces as a result of pivoting the wing folding members is variable.

12. The device as claimed in claim 8, wherein the distance between the wing folding members can be reduced until the wing folding members are in a crossed position.

13. The device as claimed in claim 8, wherein the wing folding members are located between the carrier and the pusher.

14. A production line for processing poultry carcasses transported hanging in carriers, comprising:
    a transport system provided with carriers in which the poultry is displaced in hanging position, wherein the carriers engage on the transport system with a fixed orientation such that the straight line between the engaging positions of individual legs in a carrier substantially coincides with the transporting direction of the carriers in the transport system,
    visual inspection means for inspecting external characteristics of the individual poultry animals transported by the transport system, and
    a device for conditioning poultry as claimed in claim 1,
    wherein the visual inspection means are disposed in the transporting direction upstream of the device for conditioning poultry such that the use of the device for conditioning poultry can be controlled selectively on the basis of visual inspection.

15. A method for conditioning slaughtered poultry, comprising the processing steps of:
    A) supplying a slaughtered poultry animal in line with a carrier engaging locally at a first position on a first carcass part defined by two separate legs of the poultry animal,
    B) locally engaging at least one second carcass part of the slaughtered poultry animal at a second position with an engaging element, and
    C) mechanically displacing the carrier and the engaging element relative to each other such that the first and second carcass parts move relative to each other and leg parts are displaced relative to the leg parts engaged by the carrier, wherein the second carcass part is contacted by the contact surface having an inclining position that encloses an acute angle with the vertical through the carrier such that that the second carcass part slides over the contact surface as the pusher moves inward forcing the second carcass part into a different orientation.

16. The method as claimed in claim 15, wherein the poultry animal is advanced hanging sideways from the legs.

17. The method as claimed in claim 15, wherein the engagement of the carrier on the poultry is locked.

18. The method as claimed in claim 15, wherein the carrier and the engaging element are moved during processing step C) from a first position spaced further apart to a second position closer to each other such that the engaging element pushes the poultry animal upward by the body, wherein the legs are rotated relative to the body.

19. The method as claimed in claim 18, wherein when the carrier and the engaging element are moved further apart, the wing folding members displace the wings such that the wing folding members are moved over the wings and then detach from the wings in a return movement.

20. The method as claimed in claim 15, wherein the carrier and the engaging element are moved during processing step C) from a second position lying closer to each other to a first position spaced further apart.

21. The method as claimed in claim 20, wherein the engaging element, using mutually displaceable wing folding members, engages the poultry animal at the position of the sides such that, when the carrier and the engaging element are moved apart, the wing folding members contact the body of the poultry between the wings and, when the mutual displacement of the carrier and the engaging element is continued further, press the wings away from the body of the poultry animal.

22. The method as claimed in claim 21, wherein when the carrier and the engaging element are moved further apart, the wing folding members displace the wings such that the wing folding members are moved over the wings and then detach from the wings.

23. The method as claimed in claim 21, wherein the wing folding members are in a crossed position during movement over the wings.

24. The method as claimed in claim 15, wherein after passing through processing step C) the slaughtered poultry animal is engaged manually and further processed.

25. A production line for processing poultry carcasses transported hanging in carriers, comprising:
- a transport system provided with carriers in which the poultry is displaced in hanging position, wherein the carriers engage on the transport system with a fixed orientation such that the straight line between the engaging positions of individual legs in a carrier substantially coincides with the transporting direction of the carriers in the transport system,
- visual inspection means for inspecting external characteristics of the individual poultry animals transported by the transport system, and
- a device for conditioning poultry as claimed in claim 1,
- wherein the visual inspection means are disposed in the transporting direction downstream of the device for conditioning poultry.

26. The production line as claimed in claim 25, wherein the data obtained by means of the visual inspection means are utilized to control at least one processing step on the poultry carcasses.

* * * * *